United States Patent [19]

Campagnuolo et al.

[11] 4,227,092
[45] Oct. 7, 1980

[54] HAND CRANKED ELECTRICAL POWER SOURCE

[75] Inventors: Carl J. Campagnuolo, Potomac; Leon Scheinine, Adelphi; Paul M. Mayercik, Wheaton, all of Md.

[73] Assignee: The United States of America as represented by the Secretary of the Army, Washington, D.C.

[21] Appl. No.: 855,859

[22] Filed: Nov. 30, 1977

[51] Int. Cl.³ .............................................. H02P 9/04
[52] U.S. Cl. .................................. 290/1 C; 310/75 B; 310/75 D; 310/156; 310/80
[58] Field of Search ................... 310/80, 82, 83, 75 R, 310/75 A, 75 B, 75 C, 75 D, 67 A, 156, 261, 264, 265; 74/640, 798, 801, 804; 322/17, 38, 40, 42; 290/1 R, DIG. 11, 1 C; 318/102

[56] References Cited

U.S. PATENT DOCUMENTS

| | | | |
|---|---|---|---|
| 1,490,219 | 4/1924 | Labberton | 310/265 |
| 3,169,202 | 2/1965 | Proctor | 310/82 |
| 3,239,699 | 3/1966 | Ferrary | 310/83 |
| 3,496,395 | 2/1970 | Newell | 310/82 |
| 3,604,287 | 9/1971 | Humphreys | 74/640 |
| 3,943,698 | 3/1976 | Ono | 310/156 |
| 4,044,274 | 8/1977 | Ohm | 310/83 |

FOREIGN PATENT DOCUMENTS

321584 6/1920 Fed. Rep. of Germany ........ 310/67 A

OTHER PUBLICATIONS

Speed Reducers & Component Sets Series E, USM Corp.; 8/1975.
Differential Transmission Designs, USM Corp.; 8/1975.
Speed Reducers Series M; USM Corp.; 8/1975.

*Primary Examiner*—R. Skudy
*Attorney, Agent, or Firm*—Nathan Edelberg; Robert P. Gibson; Saul Elbaum

[57] ABSTRACT

A hand-cranked power source intended for use in emergency situations to generate electrical energy. The power source features a lightweight construction as well as the ability to generate a reasonable amount of power. The preferred embodiment couples an input drive shaft to a harmonic drive system having a high speed output shaft. Upon the output shaft are preferably mounted samarium cobalt magnets forming the rotor of a three phase alternator. The output of the alternator may be utilized to power a field device, such as a radio, or the like, or may be used to charge fast-charging batteries.

11 Claims, 3 Drawing Figures

HAND CRANKED ELECTRICAL POWER SOURCE

RIGHTS OF THE GOVERNMENT

The invention described herein may be manufactured, used, and licensed by or for the United States Government for governmental purposes without the payment to us of any royalty thereon.

BACKGROUND OF THE INVENTION

1. Field of the Invention

The present invention is related to electrical power sources and, more particularly, is directed towards a novel, hand-cranked electrical power source designed especially for use in emergency situations.

2. Description of the Prior Art

Hand-cranked emergency power sources for generating electrical energy are well known. Prior patents which exemplify such devices include: German Pat. No. 321,548; and U.S. Pat. Nos. 963,412; 2,282,963; and 3,621,398.

Such hand-cranked power sources have been used, for example, to directly power field radios or other similar equipment, or to charge chemical batteries in the field. However, the prior art hand-cranked emergency power sources have enjoyed limited usefullness as a result of their excessive weight and their inability to generate any significant amount of power.

The excessive weight of the prior art generators is largely a result of their heavy planetary gearing systems which are required to step up the speed of the input drive shaft from about 60 r.p.m. to several thousand r.p.m. The limited output power available from the prior art devices results from both inefficiencies in the gearing system, as well as from the use of alnico magnets. The latter have a relatively low energy-product, and therefore must be large in size to generate any significant amount of power. This also contributes undesirably to the excessive weight of such generators.

It therefore may be appreciated that there is a great need for a portable, lightweight, emergency power source, which may be easily manually cranked by one or two persons, and which provides a reasonable amount of power over a short time interval.

OBJECTS AND SUMMARY OF THE INVENTION

It is therefore a primary object of the present invention to provide an emergency electrical power generator which overcomes all of the deficiencies noted above with respect to prior art generators.

Another object of the present invention is to provide a hand-cranked emergency power source which is portable, lightweight, durable, inexpensive to manufacture and which provides a reasonable amount of power over a short time interval.

The foregoing and other objects are attained in accordance with one aspect of the present invention through the provision of apparatus which comprises an input shaft, means for manually rotating the input shaft, harmonic drive means including means connected to the input shaft so as to rotate therewith and a high speed output shaft, magnetic rotor means connected to rotate with the high speed output shaft, and stator means positioned about the rotor means for generating electrical energy in response to the rotation of said rotor means. The means for manually rotating the input shaft preferably comprises a pair of handles, one of each of which are connected to each end of the input shaft.

In accordance with more specific aspects of the present invention, the harmonic drive means comprises a ring-shaped circular spline directly coupled to the input shaft so as to rotate therewith and having a plurality of fine teeth formed on its inner surface, a substantially cylindrical flexspline having an end with a plurality of fine teeth formed thereon and positioned within the circular spline, the number of teeth on the flexspline being different than the number on the circular spline, and a wave generator which is positioned within the spline and which comprises an elliptical ball-bearing assembly to which the high speed output shaft is rigidly connected.

In accordance with other aspects of the present invention, a casing is provided through which the input shaft extends and within which is mounted the harmonic drive means, the magnetic rotor means and the stator means. The flexspline and the stator means are rigidly connected to the casing so as to be stationary therewith. The casing further includes first bearing means for supporting the input shaft, and second bearing means for supporting the high speed output shaft. More particularly, the casing includes a substantially cylindrical side wall and a pair of end plates, each of the end plates having a bearing sleeve through which the input shaft extends and in which the first bearing means are mounted. A housing for the stator means is rigidly mounted to one of the end plates of the casing and surround the rotor means and the output shaft. The second bearing means is positioned between the high speed output shaft and the housing, and the flexspline includes an end wall mounted between said one end plate of the casing and the housing.

In accordance with another aspect of the present invention, the magnetic rotor means comprises a samarium cobalt magnet which is attached to the outer surface of the high speed output shaft so as to rotate therewith.

BRIEF DESCRIPTION OF THE DRAWING

Various objects, features and attendant advantages of the present invention will be more fully appreciated as the same becomes better understood from the following detailed description of the present invention when considered in connection with the accompanying drawing, in which.

DETAILED DESCRIPTION OF THE PREFERRED EMBODIMENT

Figure 1:
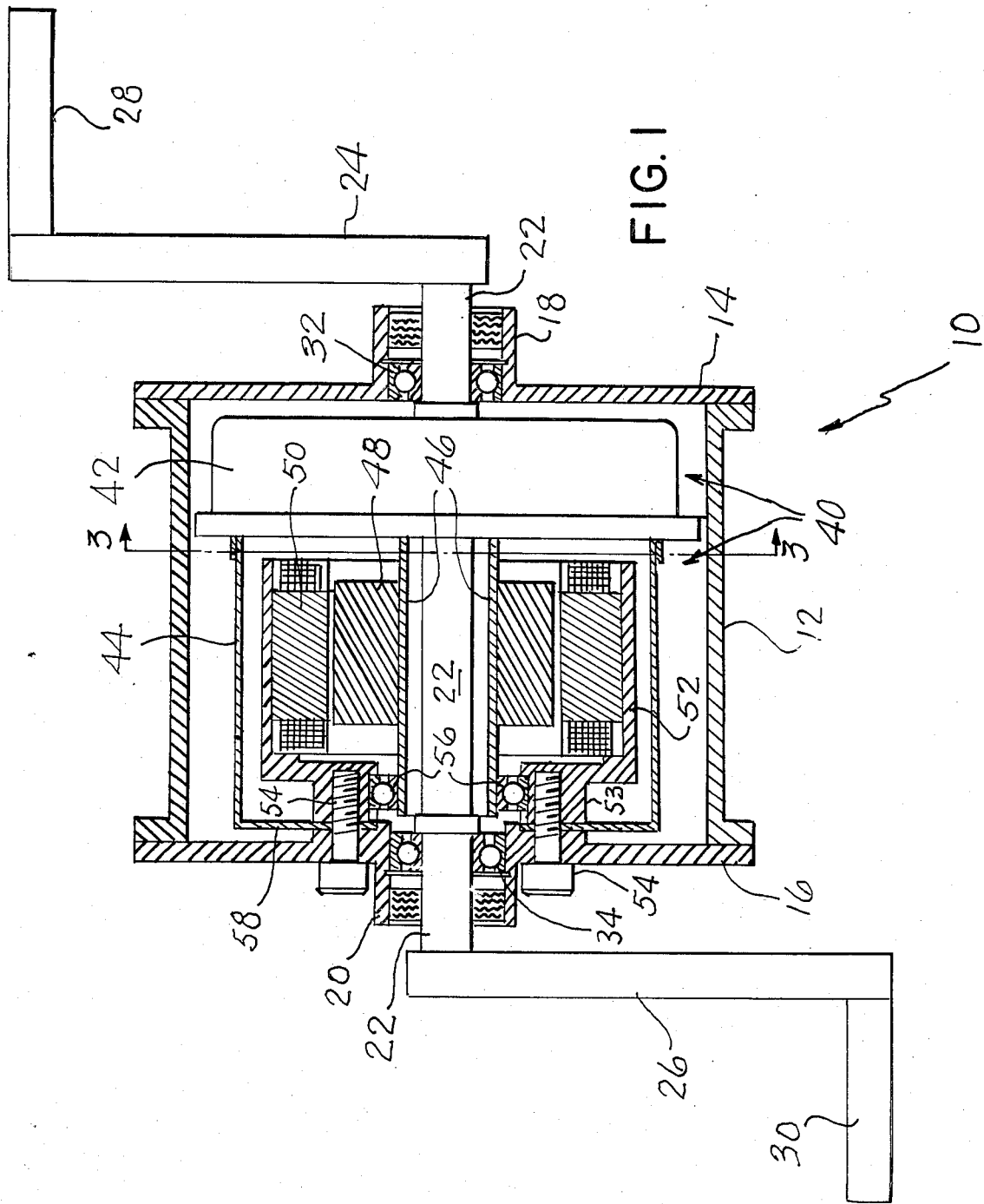
FIG. 1 is a side, partially sectional view of a preferred embodiment of the emergency electrical power source of the present invention.

Referring now to FIG. 1, there is illustrated a side, partly sectional view of a preferred embodiment of the hand-cranked electrical power source of the present invention.

Reference numeral 10 indicates generally a casing for the invention which includes a substantially cylindrical side wall 12 and a pair of end plates or covers 14 and 16 which may be secured to the side wall 12 by any conventional means.

Positioned centrally on the end plates 14 and 16 are a pair of substantially cylindrical sleeves 18 and 20. A low speed drive shaft 22 extends through the casing 10 and sleeves 18 and 20. Secured to each end of the low speed drive shaft 22 are a pair of cranking levers 24 and 26 having hand grips 28 and 30, respectively. Hand grips 28 and 30 are adapted to be manually rotated by a user, and the motion is transmitted via levers 24 and 26 to the low speed drive shaft 22.

Within the sleeves 18 and 20 are mounted a pair of bearing assemblies 32 and 34 for supporting and facilitating the rotation of drive shaft 22.

Mounted within the casing 10 of the present invention is a harmonic drive assembly, indicated generally by reference numeral 40, which is designed to step up the rotation of low speed drive shaft 22. A harmonic drive is a well known component which relies for operation upon a strain wave gearing concept as believed first set forth in C. W. Musser's U.S. Pat. No. 2,906,143. Harmonic drive assemblies are commercially available from, for example, the ICON Division of USM Corporation in Woburn, Mass.

As is well known, harmonic drive assembly 40 consists of three basic components: a circular spline 42; a flexspline 44; and a wave generator 43.

Figure 2:
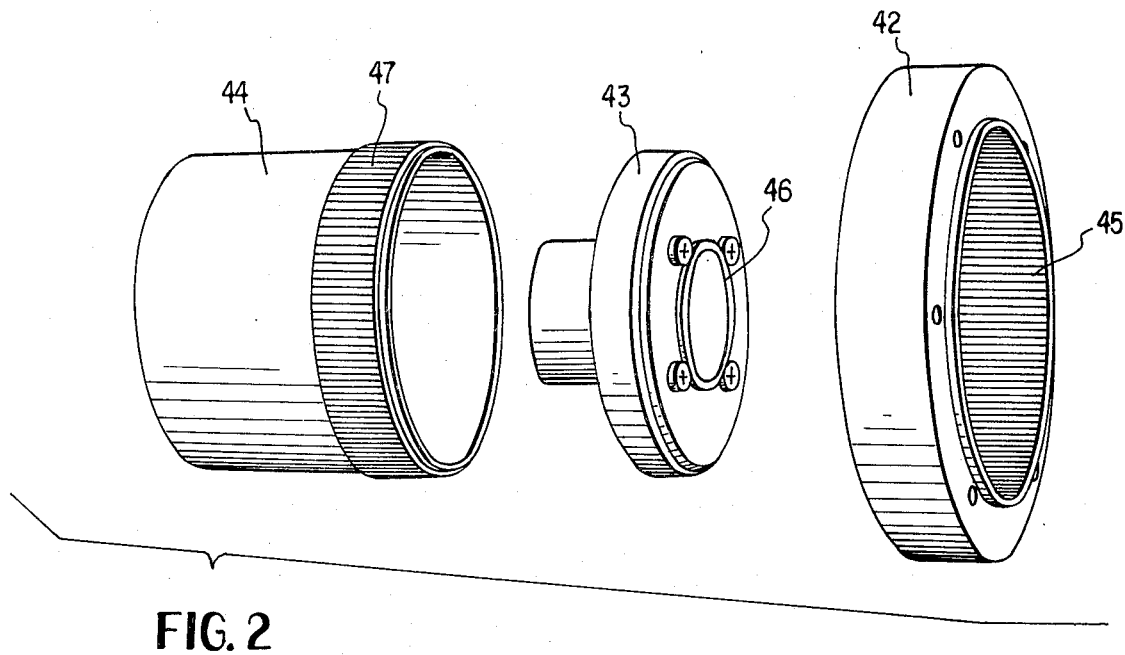
FIG. 2 is a perspective, exploded view illustrating the standard components which comprise a harmonic drive assembly which may be utilized in the preferred embodiment of FIG. 1.
Figure 3:
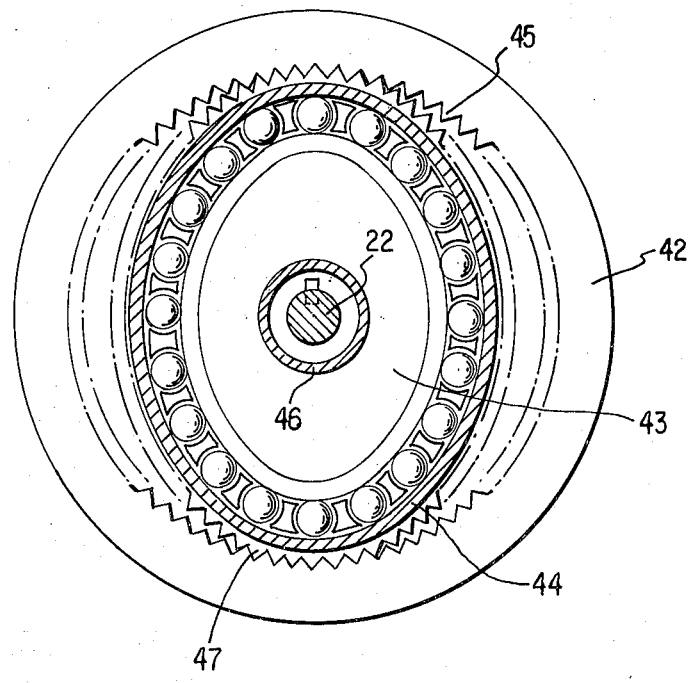
FIG. 3 is a cross-sectional view of the preferred embodiment illustrated in FIG. 1 and taken along line 3—3 thereof.

These components are illustrated in a perspective, exploded view in FIG. 2. The circular spline 42 is a ring-shaped member upon the inner periphery of which is formed a plurality of fine gear teeth 45. Circular spline 42 is directly coupled to the low speed drive shaft 22 so as to rotate therewith.

Within the circular spline 42 is positioned the flexspline 44 which is a substantially cylindrical, flexible steel ring having positioned on its outer surface a plurality of fine gear teeth 47 which are identically sized with those on the inner periphery 45 of the circular spline 42 so as to mesh therewith. However, as is conventional, the flexspline 44 has two fewer teeth than is formed on the circular spline 42.

Positioned within the flexspline 44 is a wave generator 45 which comprises, as is conventional, an elliptical steel ball-bearing assembly. The wave generator 43 includes a high-speed output shaft 46 extending therefrom.

As shown in FIG. 1, secured to the periphery of the high speed output shaft 46 is a multi-pole magnetic rotor 48, which is preferably comprised of samarium cobalt. Samarium cobalt magnets are preferred as a result of their unique properties, that include for example an energy product and an intrinsic coercivity which far exceed the corresponding values of the best permanent magnet materials previously available. The properties and advantages of samarium cobalt as a permanent magnet structure are set forth, for example, in a Research and Development Technical Report No. ECOM-4064 entitled "Electromechanical Energy Conversion Devices Utilizing Both Conventional and Rare-Earth Cobalt Permanent Magnet Materials" by R. L. Ross et al, which was published in December, 1972 by the United States Army Electronics Command in Ft. Monmouth, N.J.

A cup-shaped stator support or housing 52 includes a reduced-diameter sleeve 53 which is secured to the end wall 16 of casing 10 by means of bolts or screws 54. Mounted between the sleeve 53 of housing 52 and the distal end of high speed shaft 46 are bearings 56 for supporting rotation of shaft 46.

Note that the flexspline 44 includes an apertured end wall 58 which is sandwiched between the sleeve 53 of housing 52 and the wall 16 of casing 10 to retain the flexspline 44 stationarily within casing 10.

Positioned on the inner cylindrical surface of stator support housing 52 is a multi-pole stator assembly 50 which, together with the samarium cobalt magnetic rotor 48, forms an alternator assembly. A pair of output leads (not illustrated) are also provided.

In operation, since the circular spline 42 contains two more teeth than the flexspline 44, rotation of the former causes the latter to deform into an elliptical shape thereby engaging the wave generator through its major axis. A continuous torque application through low speed input shaft 22 causes a shift of the major axis on the flexspline 44, such that for every two teeth engagement the wave generator 43, coupled to output shaft 46, completes one full turn. By way of example, if the circular spline 42 contains 202 teeth, and the flexspline 44 contains 200 teeth, whenever the shaft 22 makes one complete revolution, the wave generator output shaft 46 has gone through one hundred revolutions, achieving a 100:1 gear ratio.

Clearly, the rotor 48 rotates at the same rotational speed as the output shaft 46 of the wave generator. Therefore, continuing the above example, if the input shaft 22 is turned via hand cranks 24, 28 and 26, 30, at sixty revolutions per minute, the rotor 48 of the alternator will be rotating at 6,000 r.p.m.

As a result of the fact that samarium cobalt contains approximately four times the energy product of the best alnico magnets presently available, a multi-pole rotor 48 of approximately 1.5 inches in diameter can produce approximately 200 watts of electrical energy at a rotational speed of about 4,000 r.p.m.

Physiological studies have indicated that an average person can steadily crank approximately 0.1 h.p., or about 75 watts. Accordingly, by using two men to crank the generator through a time-shared duty cycle, it is possible to generate 200 watts or more of electrical power. To achieve a time-shared duty cycle, individual handles 28 and 30 would be replaced by dual handles, one of each of which would be grasped by an individual. One person would crank at peak efficiency while the other rests, and then vice versa.

Obviously, numerous modifications and variations of the present invention are possible in light of the above teachings. For example, the present invention may be just as easily foot-operated as hand-operated. The present invention may be utilized to directly power a field radio or any similar equipment whose output is required for short time intervals. The invention may also be utilized to charge fast-charging batteries of the type which are able to quickly assimilate large quantities of energy without damage.

Therefore, we wish it to be understood that we do not desire to be limited to the exact details of construction shown and described, for within the scope of the appended claims the invention may be practiced otherwise than as specifically described herein.

We claim as our invention:

1. Apparatus for generating electrical power, which comprises:
   a relatively low-speed input shaft and a relatively high-speed output shaft,
   means for manually rotating said input shaft, harmonic drive means including a circular spline, a flexspline and a wave generator, said output shaft being rigidly connected to said wave generator, magnetic rotor means connected to rotate with said high-speed output shaft, and stator means positioned about said rotor means for generating electrical energy in response to rotation of said rotor means, wherein said rotor means and said stator means are arranged concentrically within said flexspline of said harmonic drive means.

2. The apparatus as set forth in claim 1, wherein said means for manually rotating said input shaft comprises a pair of handles, one connected to each end of said input shaft.

3. The apparatus as set forth in claim 1, wherein said harmonic drive means comprises:

a ring-shaped circular spline directly coupled to said input shaft so as to rotate therewith and having a plurality of fine teeth formed on its inner surface;

a substantially cylindrical flexspline having an end with a plurality of fine teeth formed thereon and positioned within said circular spline, the number of teeth on said flexspline different from that on said circular spline; and a wave generator positioned within said flexspline and comprising an elliptical ball-bearing assembly to which said high speed output shaft is rigidly connected.

4. The apparatus as set forth in claim 3, further comprising a casing through which said input shaft extends and for containing said harmonic drive means, said magnetic rotor means and said stator means.

5. The apparatus as set forth in claim 4, wherein said flexspline and said stator means are rigidly connected to said casing so as to be stationary therewith.

6. The apparatus as set forth in claim 4, wherein said casing includes first bearing means for supporting said input shaft, and second bearing means for supporting said high speed output shaft.

7. The apparatus as set forth in claim 6, wherein said casing includes a substantially cylindrical side wall and a pair of end plates, each of said end plates having a bearing sleeve through which said input shaft extends and in which said first bearing means are mounted.

8. The apparatus as set forth in claim 7, and further comprising a housing for said stator means rigidly mounted to one of said end plates and surrounding said rotor means and said output shaft, said second bearing means being positioned between said high speed output shaft and said housing.

9. The apparatus as set forth in claim 8, wherein said flexspline includes an end wall mounted between said one of said end plates of said casing and said housing.

10. The apparatus as set forth in claim 1, wherein said magnetic rotor means comprises a samarium cobalt magnet attached to the outer surface of said high speed output shaft so as to rotate therewith.

11. Apparatus as in claim 1, wherein said input shaft is positioned concentrically within said output shaft.

* * * * *